United States Patent Office 3,579,393
Patented May 18, 1971

3,579,393
MONOPROPELLANT COMPRISING CERTAIN DIFLUOROAMINO COMPOUNDS AND NITRIC ACID
Barry D. Allan, Huntsville, Ala., assignor to the United States of America as represented by the Secretary of the Army
No Drawing. Filed Jan. 28, 1963, Ser. No. 254,510
Int. Cl. C06b 7/00
U.S. Cl. 149—74   9 Claims The invention described herein may be manufactured and used by or for the Government for governmental purposes without the payment of any royalty thereon.

This invention relates to liquid propellant compositions useful for fueling rocket motors. Specifically, this invention concerns a high-energy liquid monopropellant composition utilizing difluoroamino-substituted compounds as the fuel component and nitric acid as the oxidant.

Recent efforts in the development of rocket propellant compositions have been directed towards the achievement of higher specific impulse values than those obtainable from fuels currently in use. Theoretical calculations have shown that systems based on carbon-hydrogen-oxygen-nitrogen-fluorine propellants can produce an impulse of 280 lb. sec./lb. or more while those systems based on carbon-hydrogen-oxygen-nitrogen fuels are limited to 250 lb. sec./lb.

Compounds which have been particularly useful in propellant compositions are those containing the difluoroamino group, $-NF_2$. Both solid and liquid propellants are enchanced by the presence of the difluoroamino group.

As is well known in the art, the selection of a liquid fueled or solid-fueled rocket is based on many considerations including the intended use of the rocket, range desired, item available to prepare the rocket for flight, mobility, simplicity, and size consideration. For certain applications, the liquid-fueled rocket offers many advantages over solid-fueled rockets. For example, the thrust of the liquid-fueled rocket can be varied while in flight by altering the flow of fuel and oxidizer to the combustion chamber. Moreover, the rocket motor can be completely shut-off and then re-ignited when liquid propellants are employed. Solid rocket propellants obviously cannot function in this same manner.

In liquid-fueled rockets, there is a choice of either the monopropellant engine or the bipropellant rocket engine. The monopropellant rocket engine offers a considerable advantage in simplicity and compactness over the bipropellant rocket engine since there is no duplication of parts required in storing, transporting, and injecting a single liquid whereas both the oxidant and fuel of the bipropellant rocket engine each require separate storage tanks, pumps, and piping. These traits of the monopropellant rocket engine make it particularly suitable for military application.

It has been determined that a very satifactory monopropellant composition can be achieved by mixing difluoroamino-substituted derivatives with nitric acid. Thus, there is made available a high-energy fuel which offers the above mentioned advantages of high impulse coupled with the compactness and simplicity associated with monopropellants.

The development of such a fuel is in complete opposition to the teachings of the prior art. It is well-known that one method for achieving hypergolic ignition in bipropellant rocket engines is to employ nitric acid as the oxidant and an amine as the fuel (see U.S. Pat. 2,994,190 to Mr. Gregor; U.S. Pat. 2,955,032 to Osbergetal; U.S. Pat. 2,994,191 to Hamilton; and U.S. Pat. 3,021,238 to Mahan). It is, therefore, unexpected that a substituted amine and nitric acid could be mixed together and utilized as a liquid monopropellant since the teachings of the prior art would indicate that the compounds would ignite on contact.

In accordance with the foregoing, it is an object of this invention to provide liquid monopropellant compositions comprising a mixture of one or more difluoroamino-substituted compound and nitric acid.

A still further object of the invention is to provide liquid monopropellant compositions comprising a mixture of one or more difluoroamino-substituted compounds and nitric acid, these monopropellants having improved shock sensitivity characteristics.

Other and further objects of the invention will become apparent to those skilled in the art from the following disclosure:

Many difluoroamino derivatives which are suitable as fuels have been recently made available. Especially suitable for the purpose of the invention are the difluoroamino derivatives prepared by the reaction of an ethylenically unsaturated compound with tetrafluorahydrazine. This reaction results in the addition of a mole of the tetrafluorahydrazine to the ethylenic linkage, thus producing a derivative characterized by the presence of the group

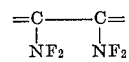

However, the present invention is not limited to difluoroamino derivatives produced by the addition reaction. Other suitable compounds having the difluoroamino group are prepared by direct fluorination reactions and still others are prepared by the reaction of difluoroamine with ketones such as acetone. The important factor is that the compound possess at least one difluoroamino group, preferably more. The manner in which the compound is synthesized is immaterial.

The ethylenically unsaturated compounds which can be employed in producing suitable difluoroamino derivatives for use as fuels are almost unlimited. Exemplary of these compounds are those corresponding to the formula

wherein R, R', R'', and R''' are alkyl, alkoxy, alkenoxy, carbalkoxy, carboxy, carbalkenoxy, alkanoyloxy, hydroxyalkyl, haloalkyl, alkoxyalkyl, and alkenyl. Illustrative of such compounds are ethylene, propylene, butene-1, butene-2, butadiene-1,3, allyl alcohol, 1,1-difluoroethylene, allyl vinyl ether, acrylic acid, ethyl acrylate, 3-butenoic acid and vinyl acetate. The ethylenically unsaturated compound can contain up to a 8 carbon atoms while each of the variable R, R', R'', and R''', can contain up to four carbon atoms. Upon reaction with tetrafluorohydrazine, these compounds yield derivatives of the formula

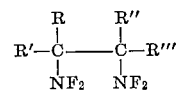

wherein R, R', R'', and R''' are as previously defined.

A preferred class of difluoroamine derivatives suitable as fuels in the propellant compositions of the invention are the tetrafluorohydrazine adducts derived for alkenes of up to 8 carbon atoms. These adducts correspond to the formula

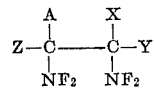

wherein A, Z, X, and Y are each selected from the group consisting of hydrogen and lower alkyl radicals. The lower alkyl radicals can contain up to four carbon atoms and be straight or branched chain. However, because of solubility considerations and overall propellant performance, the total number of carbon atoms in the molecule should not exceed eight. Therefore, A, Z, X, and Y together should not exceed six carbon atoms. Within the preferred class of compounds, the tetrafluorohydrazine adduct of isobutylene is an especially preferred embodiment. In this adduct A and Z are methyl radicals while X and Y are hydrogen. This preferred class of difluoroamino derivatives is miscible in all proportions with the nitric acid oxidants of the invention.

The nitric acid oxidizer used in the monopropellant compositions of the invention are standard commercial items. Anhydrous nitric acid is satisfactory although small amounts of water in the acid solution sometimes give better overall performance. The commercially available nitric acid compositions known as white fuming nitric acid and red fuming nitric acid are also satisfactory. Generally, red fuming nitric acid contains about 90.5% by weight $HNO_3$, about 2.5% by weight $H_2O$, and approximately 7% by weight $NO_2$. The composition varies considerably, however, depending on the particular manufacturer. Red fuming nitric acid containing 70% to 90% by weight $HNO_3$, 2% to 25% by weight $NO_2$, and up to 10% by weight water is acceptable. White fuming nitric acid generally comprises 97.5% by weight $HNO_3$, 2% by weight $H_2O$, and 0.5% by weight $NO_2$. Here, again, the composition can vary considerably within the range of 90% to 99% by weight $HNO_3$, 0% to 2% by weight $NO_2$ and up to 10% by weight water. To be acceptable for the purposes of the invention the nitric acid oxidant should contain at least 70% by weight $HNO_3$ and preferably 90% by weight $HNO_3$ or more. It should be obvious to those skilled in the art that mixtures of these nitric acid oxidizers are also useful.

The monopropellant compositions are made by agitating required amounts of nitric acid oxidant and difluoroamino derivative until thorough mixing is achieved. The mixing can be done at room temperature or slightly higher temperatures. Due to the volatility of some of the difluoroamino adducts, it is sometimes beneficial to conduct the mixing at lower temperatures to reduce losses through evaporation.

The ratio of nitric acid oxidant to the tetrafluorohydrazine adduct of the alkenes can vary from trace quantities of nitric acid to 1.5 times the stoichiometric amount. The stoichiometric amount as used herein is that amount of nitric acid oxidant required to insure complete combustion of the particular difluoroamino derivative, arbitrarily assuming that the only products of combustion are hydrogen, fluoride, carbon dioxide, nitrogen, and water. Of course, the actual $HNO_3$ content of the particular nitric acid oxidant must be taken into consideration in arriving at the actual amount of oxidizer to be employed. Thus, the stoichiometric molar ratio of anhydrous nitric acid to the tetrafluorohydrazine adduct of isobutylene is 4.0:1.0 as shown by the following equation:

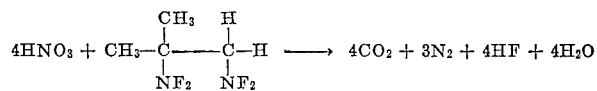

It is apparent to those skilled in the art that there are many other possible combustion products such as $H^+$, $OH^-$, $O_2$, and CO. Nevertheless, the stoichiometric ratio based on the assumed combustion products furnishes a specific base from which the preferred ratios of nitric acid oxidant to tetrafluorohydrazine adduct may be accurately defined.

The specific ratio of nitric acid oxidant to adduct for use in a particular composition is dependent upon many variables. For example, the particular motor employed may require a composition rich in fuel in order to achieve maximum performance. In such a situation the amount of oxidant employed would be less than the stoichiometric amount. Other motors may demand an excess of the oxidizing material to give optimum results. The determination of the most desirable ratio of oxidant to fuel for any particular type motor within the broad range set forth herein is a matter of routine experimentation easily within the skill of the art. The broad ratio of trace quantities of nitric acid oxidant to 1.5 times the stoichiometric amount of oxidant provides operable propellant compositions from which optimum ratios can be determined although the minimum quantity of acid oxidant will generally be .1 times the stoichiometric amount.

A propellant composition found to perform very satisfactorily in actual tests was a mixture of anhydrous nitric acid and 1,2 - bis(difluoroamino)2-methyl-propane, the adduct of isobutylene. In these tests the quantity of anhydrous nitric acid which gave the optimum performance was about 0.56 times the stoichiometric amount although any amount from .5 to .6 times the stoichiometric quantity was very satisfactory. This is a molar ratio of anhydrous nitric acid to 1,2 - bis(difluoroamino)-2-methylpropane of 2.25:1.0. The composition was prepared by mixing the ingredients in the required proportions at room temperature.

One particular disadvantage in propellant composition employing difluoroamino-substituted derivatives has been their characteristic sensitivity to mechanical shock such as would be encountered from dropping or striking a container of the propellant. Another unexpected advantage of the present monopropellant compositions of the invention is their reduced sensitivity to shock. For reasons not fully understood, the difluoroamino-substituted derivatives become less sensitive to shock in the presence of anhydrous nitric acid, red fuming nitric acid, and white fuming nitric acid. This, of course, makes procedures for handling the propellant or rockets fueled with the propellant much simpler and safer.

To determine the actual amount of shock sensitivity reduction, adiabatic compression tests were conducted on the Olin Mathieson Drop-Weight Tester. This is a standard test approved by the Joint Army-Navy-Air Force Panel on Liquid Propellant Test Methods. Essentially, the test comprises subjecting the material to be tested to the mechanical shock of a known weight falling a known distance. The size of the weight and length of the fall is varied until a combination of a particular weight falling a certain distance produces detonation in 50% of the samples tested in a reasonably large number of test. Arbitrarily, the weight is measured in kilograms while the distance the weight is dropped is measured in centimeters. The values obtained from such tests, that is, the $E_{50}$ values, are expressed in kilogram-centimeters. For example, if a 1.0 kilogram weight dropped 50 centimeters produces 50% detonations in the samples tested, that composition has an $E_{50}$ value of 50 kg.-cm. Another sample requiring a 2.0 kilogram weight falling 50 centimeters would have an $E_{50}$ value of 100 kg.-cm. Obviously, the higher the $E_{50}$ value, the less sensitive to shock is the material being tested.

Exemplary of the $E_{50}$ values of the preferred class of difluoroamino derivatives are those of 1,2-bis(difluoroamino)-2-methyl propane and 1,2-bis(difluoroamino)-4-methyl-pentane, which are 6.9 kg.-cm. and 10.1 kg.-cm., respectively. However, the $E_{50}$ value of these compounds in the presence of anhydrous nitric acid in a molar ratio of acid to difluoroamino derivative of 1.278:1.0 is 50 kg.-cm. Thus, the shock sensitivity has been reduced by a factor of at least five. Increasing the molar ratio acid to difluoroamino derivative reduces the shock sensitiviy even more.

The propellant compositions of the invention are suitable for employment in conventional liquid monopropellant rocket engines. Since the compositions are readily ignitable any convenient means of ignition will serve to ignite the propellant after it is injected into the combustion chamber. Illustrative of the satisfactory means of ignition are the slug-hypergol start and pyrotechnic igniters.

The monopropellants of the invention are not limited to mixtures of a single nitric acid oxidant and a single difluoroamino derivative. Mixtures of suitable nitric acid oxidants, as identified hereinabove, can be used in lieu of a single oxidant. Similarly, mixture of difluoroamino derivatives can be substituted for a single difluoroamino derivative. Thus, included within the scope of this invention are monopropellants comprising mixtures of two or more nitric acid oxidants and two or more difluoroamino derivatives. Moreover, dinitrogen tetraoxide may be incorporated in the monopropellants to further reduce shock sensitivity. Other additives such as zinc oxide, zinc peroxide, or other derivatives of zinc may be incorporated to reduce the corrosive effect of the nitric acid oxidant.

As previously mentioned, useful difluoroamino derivatives are those obtained by the addition reaction of tetrafluorohydrazine with an ethylenically unsaturated compound. This reaction has broad applicability, most ethylenically unsaturated compounds entering readily into the reaction. The reaction is generally represented as follows:

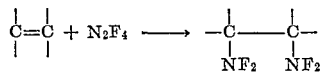

The above reaction can be conducted under a wide range of conditions. Since one mole of tetrafluorohydrazine is required for each double bond entering into the reaction, at least one mole of tetrafluorohydrazine should be employed per double bond. Generally, an excess of the tetrafluorohydrazine will increase the yield and/or shorten the reaction time. A large excess of tetrafluorohydrazine, for example, 5 moles or more, is not detrimental to the reaction. The reaction temperature can vary from 40° C. to 150° C. Moreover, the process is operable at pressures ranging from sub-atmospheric to super-atmospheric pressures. Ordinarily the pressure will vary from 100 mm. to 5 atmospheres. The reaction time is obviously dependent on other reaction conditions. Thus, the particular ethylenically unsaturated reactant, the ratio of reactants, the temperature of the reaction, and the pressure will all affect the time of reaction. Therefore, the reaction time can vary from 5 minutes to several hours depending on the particular reaction conditions.

The examples given hereinbelow are illustrative of the general method of reacting ethylenically unsaturated compounds with tetrafluorohydrazine. The reaction is illustrated with alkenes since the adducts of the alkenes represent the preferred class of difluoroamino derivatives for the propellant compositions of the invention. However, by substituting for the alkenes other ethylenically unsaturated derivatives such as styrene, allyl alcohol, methyl acrylate, vinyl acetate and divinyl ether, additional difluoroamino derivatives suitable for use in the liquid monopropellant compositions of the invention can be prepared.

EXAMPLE I

Preparation of 1,2-bis (difluoroamino)-ethane

There is introduced into a 500 cc. evacuated Pyrex bulb equipped with a stopcock and condensing arm $8.7 \times 10^{-3}$ mole crude tetrafluorohydrazine (75% $N_2F_4$; remainder being $NF_3$, $N_2O$, and NO) and $6.7 \times 10^{-3}$ mole ethylene. The bulb is then attached to a capillary monometer and heated for fifteen hours at a temperature of 110° C. to 120 °C. in an oil bath. During this period of time the pressure in the bulb decreased from 655 mm. to a pressure of 435 mm., both pressures being measured at 110° C. The bulb was removed from the oil bath and the condensing arm immersed in a bath at —196° C. A pressure of about 3 mm. of noncondensable material was pumped from the bulb. The material remaining in the bulb was warmed to room temperature and transferred into the vacuum system. A small quantity of non-volatile material remained in the reaction bulb. The material in the vacuum system was fractionated through traps maintained at —78° C., —110° C., —160° C., and —196° C. The fractions at —160° C. and —196° C. were combined and found to represent $4.8 \times 10^{-3}$ moles. The percentage composition of this combined fraction was determined by mass spectral analysis. Eighty-eight percent of the tetrafluorohydrazine had reacted, the ratio of tetrafluorohydrazine to ethylene consumed in the reaction was 1.16. The NO present as an impurity had reacted while the amounts of $NF_3$ and $N_2O$ remained virtually unchanged.

Thereafter, the —78° C. and —110° C. fractions were combined and refractionated for three hours through traps maintained at —46° C., —66° C., and —196° C. The major fraction was found in the —96° C. fraction as a colorless liquid with a vapor pressure of 32 mm. at 0° C. The same pressure was rapidly obtained by warming the sample from —96° C. or cooling the sample from room temperature, indicating the fraction was homogenous. A gas density molecular weight determination on an aliquot of the fraction gave a value of 130.3. The molecular weight of 1,2 - bis(difluoroamino) - ethane would be 132.1. The yield was 55% based on the tetrafluorohydrazine consumed.

Calcd. for $C_2H_4N_2F_4$ (percent): C, 18.19; H, 3.05; N, 21.21; F, 57.55. Found (percent): C, 18.60; H, 3.29; N, 20.55; F, 53.9.

EXAMPLE II

Preparation of 1,2-bis(difluoroamino)-propane

The apparatus was the same as employed in Example I. The reaction bulb was charged with $6.4 \times 10^3$ mole crude $N_2F_4$ and $6.1 \times 10^3$ mole propylene. The bulb was heated in an oil bath at 100° C. for eight hours. During this interval, the pressure in the bulb decreased from 518 mm. to 316 mm., both pressures being measured at 106° C. The reaction mixture was fractionated essentially as described in Example I. The major product, collected at —96° C. was a colorless liquid with a reproducible vapor pressure of 21 mm. at 0° C. A gas density molecular weight determination on an aliquot gave a value of 146.9; 1,2-bis(difluoroamino)-propane requires 146.1. The fraction weighed .45 gram representing an approximate yield of 60% based on the consumption of tetrafluorohydrazine.

Calcd. for $C_3H_4N_2F_4$ (percent): C, 24.66; H, 4.14; N, 19.18; F, 52.02. Found (percent): C, 24.72; H, 4.74; N, 18.05; F, 49.9.

EXAMPLE III

Preparation of 1,2-bis(difluoroamino)-propane

In a 500 cc. stainless steel bomb, a 1.5; 1 molar ratio of tetrafluorohydrazine to propylene was heated at 110° C. for two and one-half hours. The pressure decreased during the period of heating from 72 p.s.i. to 21 p.s.i., both pressures being measured at 25° C. The product was distilled through a Holtzman column under an atmosphere of nitrogen yielding about six grams of 1,2-bis(difluoroamino)-propane which represented a yield of approximately 90% based on the amount of propylene employed in the preparation.

From a comparison of Example II with Example III, it is seen that pressure can greatly facilitate the addition reaction.

EXAMPLE IV

Preparation of 1,2-bis(difluoroamino)-2-methyl-propane

To an evacuated 250 cc. Pyrex bulb was added 1.27 moles of tetrafluorohydrazine and 1 mole of isobutylene. The bulb was heated in an oil bath for six hours at a temperature of 110° C. The product was purified by bulb to bulb distillation which resulted in the recovery of 3.6 g.

of the liquid product. This represented approximately an 86% yield. The micro-B.P. for the product was 99.5° C. to 100° C. Various reproducible vapor pressures exhibited at different temperatures by the product are as follows: P0.0° C.=12.1 mm.; P15.0° C=26.1 mm.; P27.8° C.=49.3 mm. A quantitative hydrolysis of 61.03 mg. of the product in 35.99 ml. of 0.1111 N NaOH-10 ml. ethanol solution for twenty-one hours gave an equivalent weight of 40.14. The calculated equivalent weight is 40.0

Calcd. for $C_4H_6N_2F_4$ (percent): F, 47.5. Found (percent): F, 47.2.

By substituting 4-methyl-pentene-1 for the isobutylene of Example IV in the proportions indicated, there is produced 1,2-bis(difluoroamino)-2-methyl-pentane. The product is recovered by bulb distillation.

The methods are readily adapted to large scale operation for production of large quantities of material.

Other alkenes such as butene-1 and butene-2 can be substituted for the ethylene, propylene, and isobutylene of Examples I–IV to prepare the corresponding tetrafluorohydrazine adducts.

The above detailed description is for purposes of illustration only and no undue limitation should be attributed to the invention as a result thereof, except as set forth in the appended claims.

I claim:
1. A liquid monopropellant composition comprising a mixture of a difluoroamino substituted compound of the formula:

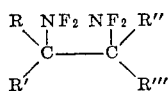

wherein R, R′, R″, and R‴ are each selected from the group consisting of alkyl, alkoxy, alkenoxy, carbalkoxy, carboxy, carbalkenoxy, alkanoyloxy, hydroxyalkyl, haloalkyl, alkoxyalkyl, and alkenyl, the total number of carbon atoms in R, R′, R″, and R‴ collectively not to exceed six and the total number of carbon atoms in each of R, R′, R″, and R‴ not to exceed four; and a white fuming nitric acid oxidant, the ratio of said acid oxidant to said difluoroamino substituted compound being from a trace amounting to 1.5 times the stoichiometric amount.

2. A liquid monopropellant composition comprising a mixture of a difluoroamino substituted compound of the formula:

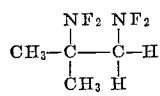

and a nitric acid oxidant containing at least 70% by weight $HNO_3$, the ratio of said nitric acid oxidant to said difluoroamino substituted compound being from a trace of nitric acid to 1.5 times the stoichiometric amount.

3. A liquid monopropellant composition according to claim 2 wherein said nitric acid oxidant is selected from the group consisting of concentrated anhydrous nitric acid, red fuming nitric acid, and white fuming acid.

4. A liquid monopropellant composition according to claim 3 wherein said nitric acid oxidant is anhydrous nitric acid.

5. A liquid monopropellant composition comprising a mixture of a difluoroamino substituted compound of the formula:

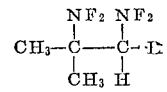

and concentrated anhydrous nitric acid oxidant, the ratio of said nitric acid oxidant to said difluoroamino compound being from 0.5 to 0.6 times the stoichiometric amount.

6. A liquid monopropellant composition comprising a mixture of a difluoroamino substituted compound of the formula:

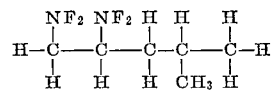

and a nitric acid oxidant containing at least 70% by weight $HNO_3$, the ratio of said nitric acid oxidant to said difluoroamino substituted compound being from a trace to 1.5 times the stoichiometric amount.

7. A storable high energy homogeneous liquid monopropellant composition characterized by low impact sensitivity consisting essentially of a substantially non-high explosive organic monopropellant wherein the said monopropellant is a difluoroaminoalkane having at least one $-NF_2$ group the length of the alkane chain being from 4 to 10 carbon atoms plus a supplementary oxidizing agent consisting essentially of a white fuming nitric acid of low water content, the oxidizing agent being sufficient to permit the carbon of the monopropellant to be converted into essentially gaseous oxides of carbon during combustion.

8. The composition according to claim 7 wherein the oxidizing agent is white fuming nitric acid and the difluoroamine compound is bisdifluoroaminobutane.

9. A storable high energy homogeneous liquid monopropellant composition characterized by low impact sensitivity consisting essentially of a substantially non-high explosive organic monopropellant wherein the said monopropellant is a difluoroaminoalkane having at least one $-NF_2$ group the length of the alkane chain being from 4 to 8 carbon atoms plus a supplementary oxidizing agent consisting essentially of a white fuming nitric acid of low water content, the oxidizing agent being sufficient to permit the carbon of the monopropellant to be converted into essentially gaseous oxides of carbon during combustion.

References Cited

UNITED STATES PATENTS 3,310,444   3/1967   Gould et al. _____ 149—74

LELAND A. SEBASTIAN, Primary Examiner

U.S. Cl. X.R.

149—109; 260—583NH, 584C